2 Sheets--Sheet 1.
A. CHAMBERS.
Rotary Measure.
No. 164,424. Patented June 15, 1875.
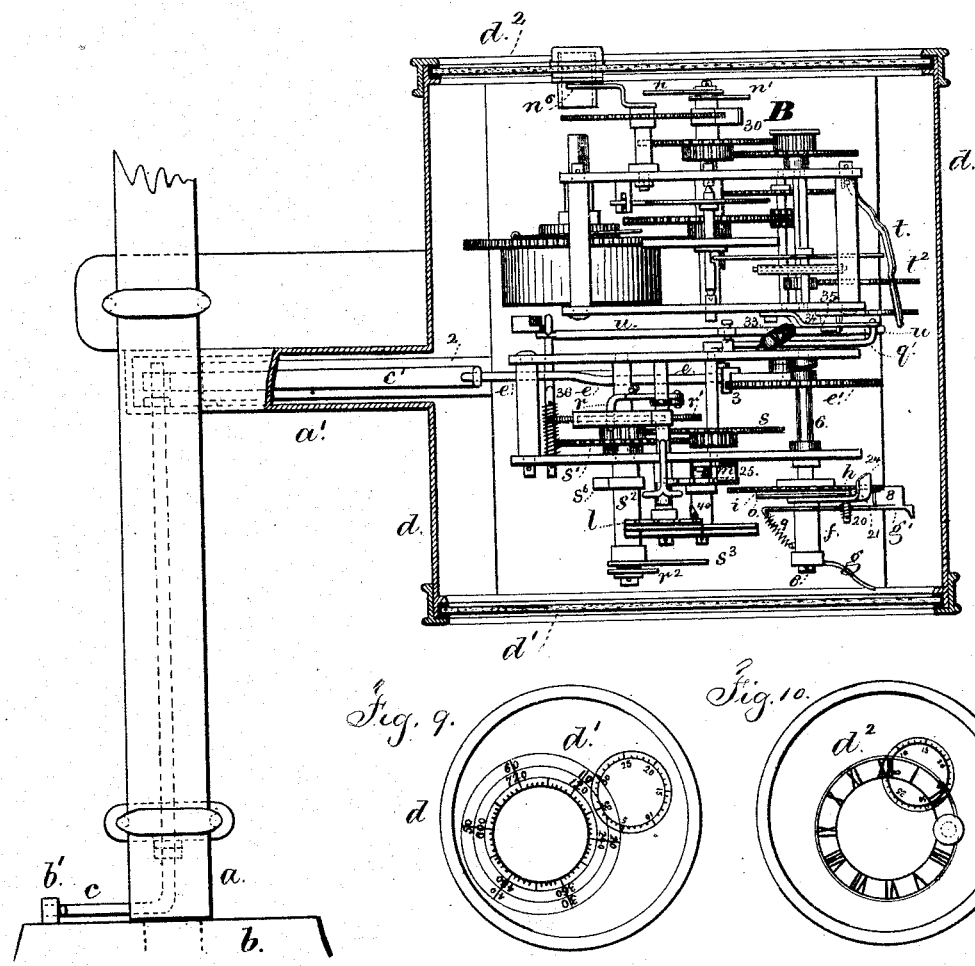
Witnesses
Chas H Smith
George Serrell
Inventor
Adam Chambers
per Lemuel W. Serrell
Atty.
THE GRAPHIC CO.PHOTO-LITH.39 & 41 PARK PLACE,N.Y.

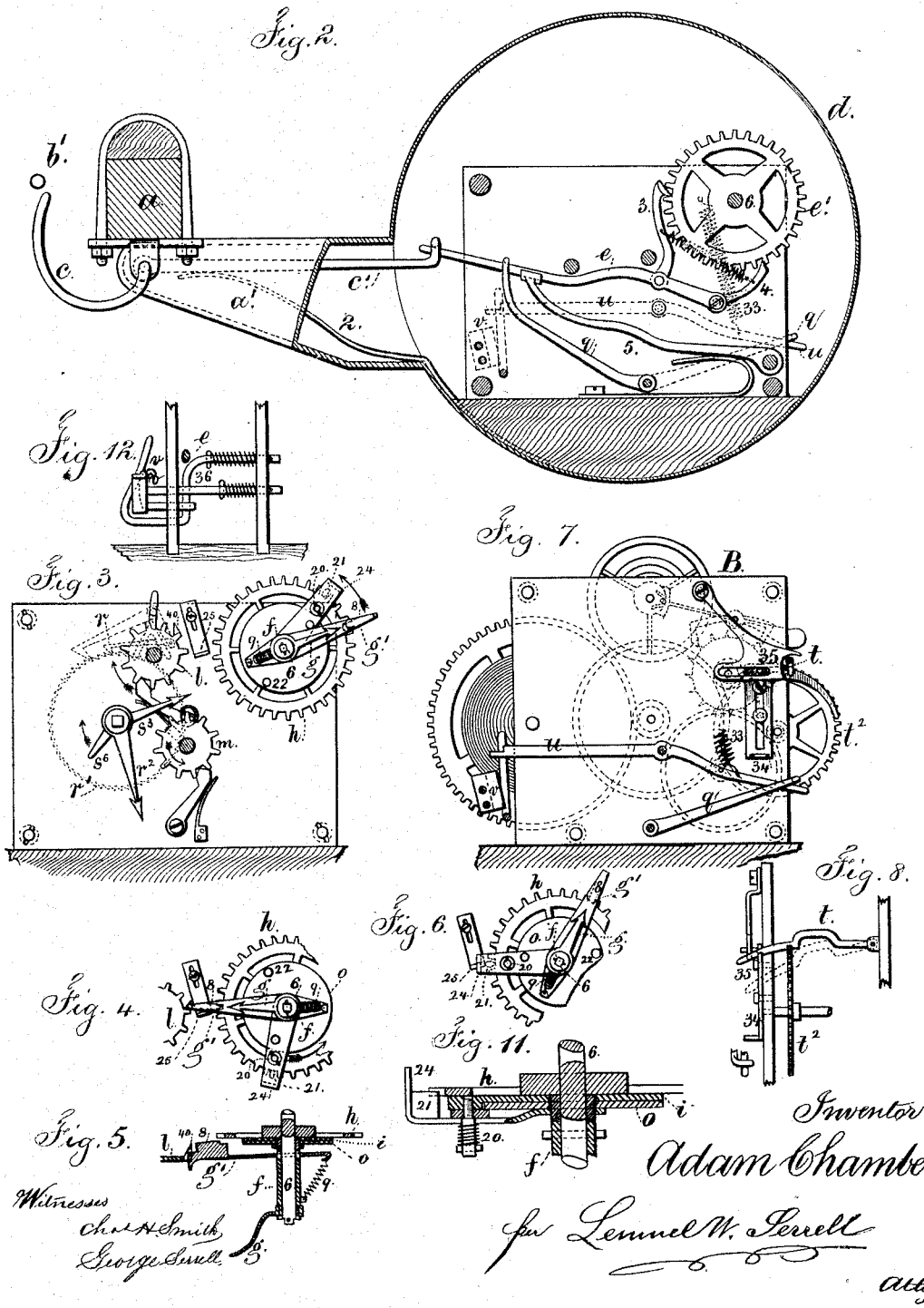

UNITED STATES PATENT OFFICE.

ADAM CHAMBERS, OF PUEBLO, COLORADO TERRITORY.

IMPROVEMENT IN ROTARY MEASURES.

Specification forming part of Letters Patent No. 164,424, dated June 15, 1875; application filed April 7, 1875.

*To all whom it may concern:*

Be it known that I, ADAM CHAMBERS, of Pueblo, in the county of Pueblo and Territory of Colorado, have invented an Improvement in Odometers, of which the following is a specification:

Odometers have been attached both to the wheel and to the axle for registering the number of revolutions of a wheel, and the consequent distance traveled.

My invention is made for accomplishing this object by mechanism that can be easily adapted to the irregular counting motion consequent upon the circumference of the wheel not being contained an even number of times in a mile. Besides this, my improvement provides for combining, with the odometer, a time-register that is maintained in motion while the vehicle is moving, and is stopped when such vehicle stops; thereby a complete record is kept of the number of hours the vehicle is in motion, so as to indicate the average rate of speed and prevent questions arising between owners of vehicles and persons hiring the same as to the time occupied in journeying the distance traveled, or the time during which the vehicle was at rest. I accomplish these objects by a clock movement and stop that is kept out of action by the movement of the odometer; hence such stop becomes operative automatically when the vehicle ceases to move.

In the drawing, Figure 1 is a general plan view, with the case of the odometer in section. Fig. 2 is a sectional view of the counting appliances. Fig. 3 is an elevation of the computating mechanism. Figs. 4, 5, and 6 represent parts of the computating-wheels. Figs. 7 and 8 represent the stop motion for the clock, and Figs. 9 and 10 show face views of the dials.

Upon the axle $a$ the hub $b$ of the wheel revolves, and, by the pin $b'$ acting upon the bent cam-shaped arm $c$, motion is given to the shaft that runs along below the axle, and passes into the case $a'$, and connects with the lever $c'$, that is moved by the spring 2, when $c$ is liberated from the pin $b'$. It is preferable to have a rubber packing or washer to exclude dust where the shaft enters the case $a'$. The works of the odometer are in the case $d$—that is, at the end of the hollow arm or case $a'$—and at one end is a cap and dial, $d^1$, Fig. 9, and at the other end is the cap and dial $d^2$ (See Fig. 10.) These are preferably painted upon glass, so that the hands show behind the glass, and the works of the odometer are entirely excluded from dust by elastic packings or washers, and the dials are attached in place or secured by locks, so that the works cannot be injured or misplaced. The lever $c'$ operates the lever $e$ and pawl 3, that moves the first counting-wheel $e'$, and 4 is the stop-pawl to such wheel, and 5 is a spring-lever to give the return movement to the lever $e$ and pawl 3. The shaft 6 of the wheel $e'$ has at its end a loose sleeve, $f$, to which a pointer, $g$, is connected, and also a lever, $g'$, that swings on this sleeve, and has a tooth, 8, at the back of the lever that is pressed between the teeth upon the wheel $h$ by the spring 9. This wheel $h$ is fastened firmly to its shaft 6; hence every revolution of the wheels $e'$ and $h$ by the step-by-step movement the end of the lever $g'$ comes in contact with one tooth of the second counting-wheel $l$, and turns the same one space.

It is seldom that the carriage-wheel is of such diameter that the circumference will be contained in a mile an even number of times, so that one mile will be traveled when the wheels $h$ and $e'$ have gone around a sufficient number of times to make one turn of the second counting-wheel $l$. Hence I employ a compensating device that turns the mile dial or counter $l$ the last movement of the revolution, whereby I am enabled to drop from the computation as many revolutions of the carriage-wheel as may be required to make up the deficiency and reach the end of the miles as the mile-wheel is moved.

To accomplish this I employ two disks, $i$ and $o$, upon the shaft 6. They are clamped together at any required point by the screw 20. One disk carries the spring-tooth 21, and the other the stop 22. These parts are shown in larger size in Fig. 11. One of the star-teeth, 40, of the dial $l$, is inclined, so that as the end of the lever $g'$ comes against it the lever end is pushed back enough to throw the tooth 8 at the back of the lever $g'$ out from between the teeth of the wheel $h$, as shown in Figs. 4 and 5, and hence said wheel $h$ will continue to revolve without turning the lever or counting on the second dial $l$ until the stop 22 of the disk $o$, coming around against the side of the lever $g'$, completes the movement of the lever $g'$, and turns the second counter $l$ its last notch of the mile as the vehicle reaches the end of the mile. The movement of the wheels $e'$ and $h$ continuing, the inclined end 24 of the arm of the disk $i$ stops against the stationary incline 25, as shown in Fig. 6, and thereby it is pressed back sufficiently to disconnect its stop 21 from the wheel $h$, and thus it remains until the lever $g'$ coming around against the arm of such disk $i$, the end 24 is carried off the incline 25, its stop 21 takes the teeth of $h$, and the parts are replaced in the first position without the movement of the arm $g'$ being again checked.

By this construction a final turn of the second dial $l$ will be made to complete the mile record by a greater number of revolutions of the carriage-wheel than usual, and according to the position in which the two disks $i$ and $o$ are clamped together, so the lever $g'$ will remain inoperative during a greater or less number of revolutions of the carriage-wheel in reaching the end of the mile.

A projection upon the shaft of the dial $l$ acts upon a swinging pawl, $r$, that takes up one tooth at a time upon the counting-wheel $r^1$ of the hand $r^2$, and from this wheel $r^1$ motion is taken to the wheel $s$ by a pinion, and thence back to the wheel $s^1$, sleeve $s^2$, and hand $s^3$, so as to keep accounts of miles and hundreds of miles, and a fourth counter, $m$, may be used—that is, turned one tooth each revolution of $s$ by a tooth, $s^6$, upon the sleeve $s^2$, thereby computing to thousands of miles, if desired.

For determining the number of hours during which the vehicle is moving I employ an ordinary spring marine or balance clock movement, B, of any ordinary character, with hands $n$ $n^1$ and and tooth 30, that turns the indicating-hand $n^6$ one space every twelve hours, so as to keep records of days. In order, however, to stop the clock-movement when the vehicle is standing still, I employ the fly-stop $t$, that is made of a light piece of metal jointed at one end to the clock-frame, so that it has a limited movement, and can be lifted out of the teeth of the wheel $t^2$ of the clock-movement, and thrown backward to fall at a distance down the wheel, and be brought up upon the wheel again. This is done each revolution of the carriage-wheel, so that when the carriage is moving the fly-stop is constantly moved back out of the way; but when the carriage stops the fly-stop arrests the movement of the clock. As the lever $e$ is raised it moves the rocking lever $q$, and depresses the back end of the fly-lever $u$, straining the spring 33, and allowing the slide 34 to descend, and the hanging ejector 35 to drop; but when the lever $e$ is depressed the spring 33 draws the lever $u$, so that the end rests upon the spring-latch block $v$, and the lever $e$, in its further movement, acts upon the spring-finger slide 36, (see Fig. 12,) to move the same by passing down between a portion of the slide and the frame, and in so doing the lever $u$ is pressed off the latch-block $v$, and the other end flies up and strikes the slide 34, so that that and the ejector throw the stop $t$ back farther down the wheel $t^2$, and prevent its arresting the clock-movement, as aforesaid.

I claim as my invention—

1. The two disks $i$ and $o$, with their respective stops turning upon the shaft of the wheel $h$, in combination with the sleeve $f$, lever $g'$, stationary incline 25, second counting-wheel $l$, and its incline 40, substantially as and for the purposes set forth.

2. The combination, with the odometer, of a clock-movement and a stop, operated by the odometer so as to compute the period of time in which the vehicle is in motion, as set forth.

3. The fly-stop $t$, slide 34, and ejector 35, operated by the spring-lever $u$, that receives motion from the lever $e$, in combination with the clock-movement and odometer-register, substantially as set forth.

Signed by me this 30th day of November, A. D. 1874.

ADAM CHAMBERS.

Witnesses:
H. J. SEWARD,
JOHN W. PYLE.